United States Patent
Rachi et al.

(10) Patent No.: US 9,627,103 B2
(45) Date of Patent: Apr. 18, 2017

(54) TERMINATED COVERED ELECTRIC WIRE, WIRE HARNESS, AND ANTICORROSIVE AGENT

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hironobu Rachi, Yokkaichi (JP); Tetsuya Nakamura, Yokkaichi (JP); Shigeyuki Tanaka, Yokkaichi (JP); Yutaka Takata, Yokkaichi (JP); Naoyuki Oshiumi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/772,253

(22) PCT Filed: Dec. 2, 2013

(86) PCT No.: PCT/JP2013/082350
§ 371 (c)(1),
(2) Date: Sep. 2, 2015

(87) PCT Pub. No.: WO2014/147893
PCT Pub. Date: Sep. 25, 2014

(65) Prior Publication Data
US 2016/0012943 A1 Jan. 14, 2016

(30) Foreign Application Priority Data

Mar. 22, 2013 (JP) ................................. 2013-059268

(51) Int. Cl.
*H01B 3/30* (2006.01)
*H01B 7/28* (2006.01)
(Continued)

(52) U.S. Cl.
CPC ....... *H01B 7/2806* (2013.01); *B60R 16/0215* (2013.01); *C08L 9/02* (2013.01);
(Continued)

(58) Field of Classification Search
USPC ........................................................ 174/72 A
See application file for complete search history.

(56) References Cited

U.S. PATENT DOCUMENTS 8,076,572 B2 * 12/2011 Sawai ..................... F16K 31/02
174/20
2002/0114939 A1 8/2002 Schumann et al.
(Continued)

FOREIGN PATENT DOCUMENTS

CN 101891914 A 11/2010
CN 102933749 A 2/2013
(Continued)

OTHER PUBLICATIONS

Apr. 22, 2014 International Search Report issued in International Application No. PCT/J132013/082350.
(Continued)

*Primary Examiner* — William H Mayo, III
*Assistant Examiner* — Krystal Robinson
(74) *Attorney, Agent, or Firm* — Oliff PLC

(57) ABSTRACT

A wire harness includes a terminated covered electric wire. The terminated covered electric wire includes a terminal
(Continued)

fitting, an electric wire conductor, and an electrical connection portion in which the terminal fitting and the electric wire conductor are electrically connected to each other. The terminal fitting has a surface to which processing oil adheres, and the electrical connection portion is covered with an anticorrosive agent containing an adhesive resin and an oil-adsorbing organic macromolecule to configure a terminated covered electric wire.

17 Claims, 2 Drawing Sheets

(51) Int. Cl.
    *C09D 7/12*    (2006.01)
    *C09D 201/00*    (2006.01)
    *H01R 4/70*    (2006.01)
    *C09D 5/08*    (2006.01)
    *C09J 11/08*    (2006.01)
    *H01R 4/18*    (2006.01)
    *B60R 16/02*    (2006.01)
    *C08L 9/02*    (2006.01)
    *C08L 11/00*    (2006.01)
    *C08L 25/04*    (2006.01)

(52) U.S. Cl.
    CPC ............... *C08L 11/00* (2013.01); *C08L 25/04* (2013.01); *C09D 5/08* (2013.01); *C09D 7/12* (2013.01); *C09D 201/00* (2013.01); *C09J 11/08* (2013.01); *H01B 3/30* (2013.01); *H01R 4/185* (2013.01); *H01R 4/70* (2013.01)

(56) References Cited

U.S. PATENT DOCUMENTS

| | | | | |
|---|---|---|---|---|
| 2004/0238200 A1* | 12/2004 | Tanaka | ............... | H01R 13/5216 174/74 R |
| 2005/0006135 A1 | 1/2005 | Nakayama | | |
| 2009/0062411 A1 | 3/2009 | Rappmann et al. | | |
| 2009/0229880 A1* | 9/2009 | Watanabe | .............. | H01R 4/183 174/72 A |
| 2010/0212936 A1* | 8/2010 | Arai | ....................... | H01B 7/285 174/23 R |
| 2012/0205151 A1 | 8/2012 | Inoue et al. | | |
| 2013/0032394 A1 | 2/2013 | Inoue et al. | | |
| 2013/0056266 A1 | 3/2013 | Inoue et al. | | |
| 2013/0062114 A1 | 3/2013 | Inoue et al. | | |
| 2013/0098679 A1 | 4/2013 | Takata et al. | | |

FOREIGN PATENT DOCUMENTS

| | | |
|---|---|---|
| CN | 102947489 A | 2/2013 |
| DE | 10063661 A1 | 9/2002 |
| DE | 102006014190 A1 | 9/2007 |
| JP | S50-11945 A | 2/1975 |
| JP | H10-203671 A | 8/1998 |
| JP | 2002-315130 A | 10/2002 |
| JP | 2005019392 A | 1/2005 |
| JP | 2011-111632 A | 6/2011 |
| JP | 2011179101 A | 9/2011 |
| JP | 2011-256429 A | 12/2011 |
| JP | 2012001740 A | 1/2012 |
| JP | 2012-041494 A | 3/2012 |
| JP | 2013-025931 | 2/2013 |
| JP | 2013-025932 A | 2/2013 |

OTHER PUBLICATIONS

Sep. 6, 2016 Office Action issued in Japanese Patent Application No. 2013-059268.
Jun. 14, 2016 Office Action issued in Japanese Application No. 2013-059268.
Oct. 17, 2016 Office Action and Search Report issued in Chinese Patent Application No. 201380074707.0.
Nov. 10, 2016 Office Action issued in German Patent Application No. 11 2013 006 860.5.

* cited by examiner

TERMINATED COVERED ELECTRIC WIRE, WIRE HARNESS, AND ANTICORROSIVE AGENT

TECHNICAL FIELD

The present invention relates to a covered electric wire with a terminal (terminated covered electric wire), a wire harness, and an anticorrosive agent, and more specifically to a terminated covered electric wire in which an electrical connection portion between an electric wire conductor and a terminal fitting has an excellent anticorrosive performance, a wire harness using the same, and an anticorrosive agent that has an excellent anticorrosive performance.

BACKGROUND ART

A terminal fitting is connected to an electric wire conductor at an end of a covered electric wire to be arranged in a vehicle such as an automobile. In an electrical connection portion in which the electric wire conductor of the covered electric wire and the terminal fitting are electrically connected to each other, it is required to prevent corrosion. Particularly, in recent years, in order to reduce the weight of a vehicle such as an automobile, the use of aluminum or an aluminum alloy as a material of the electric wire conductor has been considered. On the other hand, copper or a copper alloy is often used as a material of the terminal fittings. In addition, the surface of the terminal fittings is often plated with tin or the like. That is, the material of the electric wire conductor and the material of the terminal fittings may be different from each other. If the material of the electric wire conductor and the material of the terminal fitting are different from each other, corrosion occurs in the electrical connection portion therebetween due to the contact between different metals. Therefore, it is required to reliably prevent corrosion in the electrical connection portion.

Attempts have been made to inject grease into the electrical connection portion and to cover the electrical connection portion with an adhesive resin in order to prevent corrosion in the electrical connection portion. For example, Patent Document 1 discloses a polyamide resin composition for corrosion prevention.

CITATION LIST

Patent Documents

Patent Document 1: JP 2012-41494A

SUMMARY OF THE INVENTION

Technical Problem

In general, the terminal fitting is shaped into a predetermined shape by pressing using processing oil. The processing oil may also be used when the terminal fitting is crimped to the electric wire conductor. The processing oil used during the processing inevitably remains on the surface of the terminal fitting. This oil hinders the adhesion between the anticorrosive agent and the terminal fitting. As a result, a gap is likely to be formed between the anticorrosive agent and the terminal fitting, and moisture and the like infiltrates the gap. Therefore, it may be difficult to obtain a sufficient anticorrosive performance.

It is an object of the present invention to provide a terminated covered electric wire and a wire harness in which an anticorrosive agent comes into intimate contact with the surface of a terminal fitting and a high anticorrosive performance is exhibited in an electrical connection portion between an electric wire conductor and the terminal fitting even when oil adheres to the surface of the terminal fitting, and to provide an anticorrosive agent capable of exhibiting such a high anticorrosive performance.

Solution to Problem

In order to solve the foregoing problems, a terminated covered electric wire according to the present invention has an electrical connection portion in which a terminal fitting and an electric wire conductor of a covered electric wire are electrically connected to each other, the electrical connection portion being covered with an anticorrosive agent containing an adhesive resin and an oil-adsorbing organic macromolecule.

Here, it is preferable that the oil-adsorbing organic macromolecule is contained in the anticorrosive agent in an amount in a range of 1 to 50 mass %.

It is preferable that the oil-adsorbing organic macromolecule is oil-adsorbing elastomer or oil-adsorbing rubber. On the other hand, it is preferable that the adhesive resin is at least one selected from an acrylic resin, an epoxy resin, a polyamide resin, a urethane resin, a silicone resin, and a polyolefin resin. Moreover, it is preferable that the adhesive resin is selected from an ultraviolet curable resin, a heat curable resin, a moisture curable resin, and a two-part reaction curable resin.

A wire harness according to the present invention has the above terminated electric wire.

An anticorrosive agent according to the present invention contains an adhesive resin and an oil-adsorbing organic macromolecule.

Here, it is preferable that the oil-adsorbing organic macromolecule is contained in the anticorrosive agent in an amount in a range of 1 to 50 mass %.

It is preferable that the oil-adsorbing organic macromolecule is oil-adsorbing elastomer or oil-adsorbing rubber. On the other hand, it is preferable that the adhesive resin is at least one selected from an acrylic resin, an epoxy resin, a polyamide resin, a urethane resin, a silicone resin, and a polyolefin resin. Moreover, it is preferable that the adhesive resin is selected from an ultraviolet curable resin, a heat curable resin, a moisture curable resin, and a two-part reaction curable resin.

Advantageous Effects of the Invention

With the terminated covered electric wire according to the present invention, the oil-adsorbing organic macromolecule contained in the anticorrosive agent adsorbs the processing oil adhering to the surface of the terminal fitting and the adhesive resin contained in the anticorrosive agent easily adheres to the metal on the surface of the terminal fitting. Therefore, an excellent anticorrosive performance is obtained.

Here, if the oil-adsorbing organic macromolecule is contained in the anticorrosive agent in an amount in a range of 1 to 50 mass %, the adhesiveness of the adhesive resin with respect to the terminal fitting is effectively improved, and a decrease in the heat resistance of the anticorrosive agent due to the oil-adsorbing organic macromolecule being contained in a large amount is avoided.

If the oil-adsorbing organic macromolecule is oil-adsorbing elastomer or oil-adsorbing rubber, flexibility is imparted to the anticorrosive agent, and thus the adhesiveness between the anticorrosive agent and the surface of the terminal fitting is further improved due to stress relaxation effect. On the other hand, if the adhesive resin is selected from an acrylic resin, an epoxy resin, a polyamide resin, a urethane resin, a silicone resin, and a polyolefin resin, a high anticorrosive performance is exhibited. Moreover, if the adhesive resin is selected from an ultraviolet curable resin, a heat curable resin, a moisture curable resin, and a two-part reaction curable resin, application onto the electrical connection portion and curing can be performed with high efficiency.

Since the wire harness according to the present invention includes the above terminated electric wire, a high anticorrosive performance is exhibited in an electrical connection portion between the terminal fitting and the covered electric wire even when oil adheres to the surface of the terminal fitting.

The anticorrosive agent according to the present invention exhibits a high adhesive force and can impart a high anticorrosive performance to members to which the anticorrosive agent is applied even when oil adheres to a surface onto which the anticorrosive agent is to be applied.

DESCRIPTION OF EMBODIMENTS

Hereinafter, an embodiment of the present invention will be described in detail using the drawings.

Figure 1:
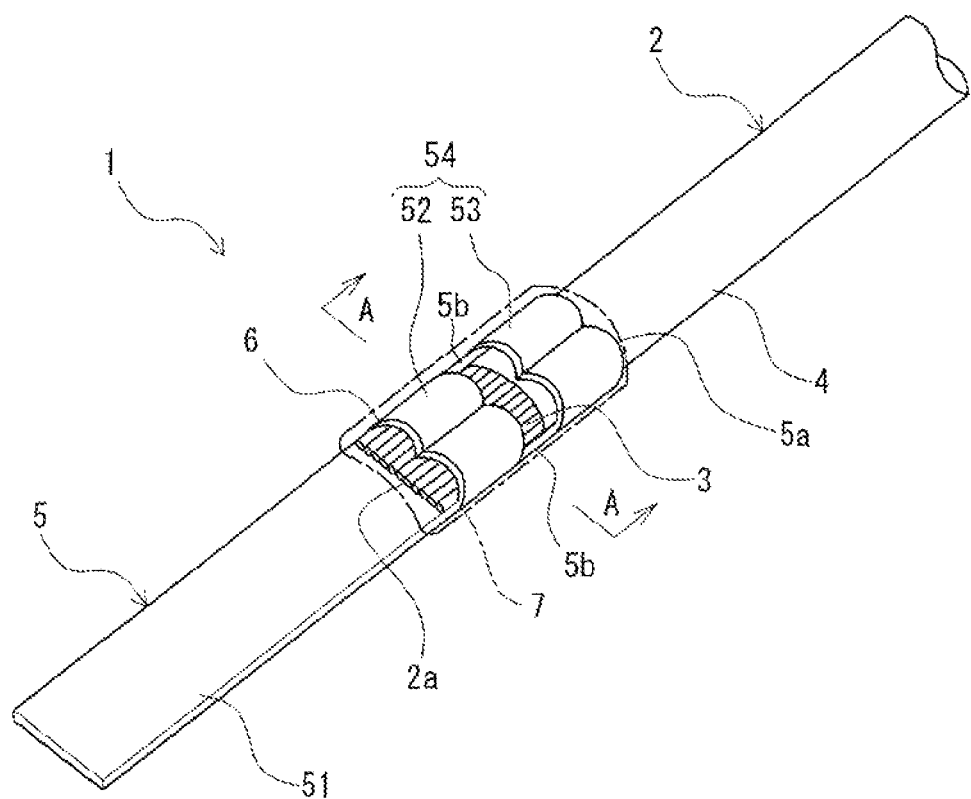
FIG. 1 is a perspective view of the exterior of an example of a terminated covered electric wire according to the present invention.
Figure 2:
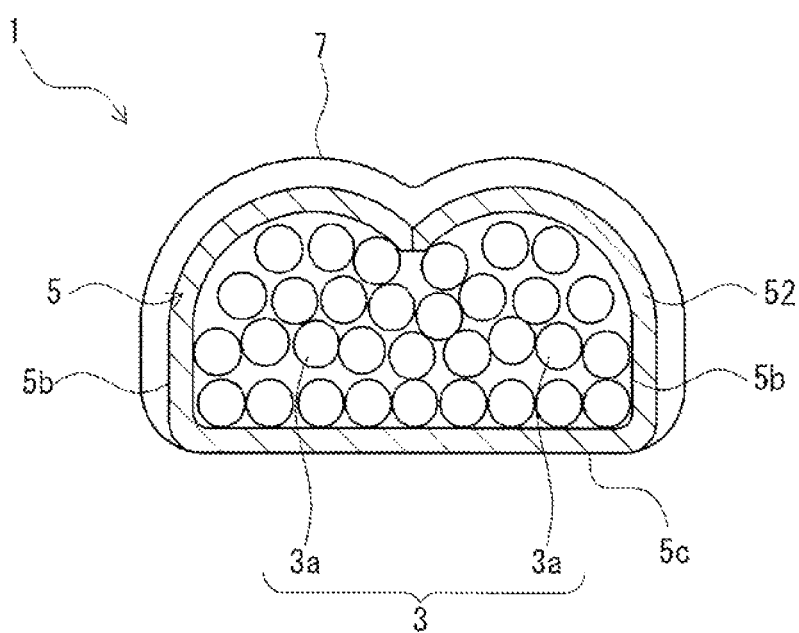
FIG. 2 is a longitudinal cross-sectional view taken along line A-A in FIG. 1.

FIG. 1 is a perspective view illustrating the exterior of an example of a terminated covered electric wire according to the present invention, and FIG. 2 is a longitudinal cross-sectional view taken along line A-A in FIG. 1. As shown in FIGS. 1 and 2, in a terminated covered electric wire 1 according to the present invention, a covered electric wire 2 includes an electric wire conductor 3 that is covered with an insulator 4, and the electric wire conductor 3 of the electric wire 2 is electrically connected to a terminal fitting 5 in an electrical connection portion 6.

The terminal fitting 5 includes a tab-shaped connecting portion 51 constituted by an elongated plate to be connected to a partner terminal, and an electric wire fixing portion 54 constituted by a wire barrel 52 and an insulation barrel 53 that are formed so as to extend from the end portion of the connecting portion 51.

In the electrical connection portion 6, the electric wire conductor 3 is exposed by peeling the insulator 4 at the end of the covered electric wire 2, and the covered electric wire 2 and the terminal fitting 5 are connected to each other by crimping this exposed electric wire conductor 3 to the terminal fitting 5 on one surface side. The electric wire conductor 3 and the terminal fitting 5 are electrically connected by crimping the wire barrel 52 of the terminal fitting 5 over the electric wire conductor 3 of the covered electric wire 2. In addition, the insulation barrel 53 of the terminal fitting 5 is crimped over the insulator 4 of the covered electric wire 2.

The terminal fitting 5 is shaped (processed) into a predetermined shape by pressing a metal plate. Processing oil such as a hydrocarbon-based processing oil is used during the pressing. Accordingly, the processing oil remains on (adheres to) the surface of the terminal fitting 5 just after the terminal fitting 5 is shaped. Furthermore, the processing oil may also be used during crimping (processing). In this case, the processing oil remains on (adheres to) the surface of the terminal fitting 5 just after the terminal fitting 5 is crimped. The processing oil also remains on (adheres to) the surface of the electric wire conductor 3 just after the electric wire conductor 3 undergoes the crimping, similarly to the terminal fitting 5. The processing oil typically adheres thereto in an amount of about 0.01 to 1.0 mg/cm$^2$.

The range shown by the dashed-dotted line in FIG. 1 of the electrical connection portion 6 is covered with an anticorrosive agent 7 according to the present invention in a state in which the processing oil adheres to the surface of the terminal fitting 5. It should be noted that in the electrical connection portion 6 in FIG. 1, the anticorrosive agent 7 is shown in a transparent manner The anticorrosive agent 7 prevents infiltration of moisture and the like from the outside into the electric wire conductor 3, a portion in which the electric wire conductor 3 and the terminal fitting 5 are in contact with each other, and the like, and corrosion of metal parts.

The specific portions covered with the anticorrosive agent 7 are described below. As shown in FIG. 1, the covered electric wire 2 on a front end 2a side is covered with the anticorrosive agent 7 such that the anticorrosive agent 7 slightly protrudes toward a side of the connecting portion 51 of the terminal fitting 5 from the front end of the electric wire conductor 3. The terminal fitting 5 on a front end 5a side is covered with the anticorrosive agent 7 such that the anticorrosive agent 7 slightly protrudes toward a side of the insulator 4 of the covered electric wire 2 from the end portion of the insulation barrel 53. As shown in FIG. 2, side surfaces a of the terminal fitting 5 are also covered with the anticorrosive agent 7. A back surface 5c of the terminal fitting 5 is not covered with the anticorrosive agent 7. In this manner, the electrical connection portion 6 is covered with the anticorrosive agent 7 with a predetermined thickness along the outer peripheral shapes of the terminal fitting 5 and the covered electric wire 2. A portion from which the electric wire conductor 3 is exposed by peeling the end of the covered electric wire 2 is completely covered with the anticorrosive agent 7, and thus is not exposed to the outside. It should be noted that the back surface side of the electric wire fixing portion 54 of the terminal fitting 5 (including the back surface sides of the wire barrel 52 and the insulation barrel 53) may be covered with the anticorrosive agent 7 as long as there is no influence on the electric connection.

Accordingly, three sides of the lateral ends of the anticorrosive agent 7 with which the electrical connection portion 6 is covered are in contact with the surface of the terminal fitting 5 and one end thereof is in contact with the surface of the insulator 4. That is, most of the lateral ends of the anticorrosive agent 7 is in contact with the surface of the terminal fitting 5.

Here, if a conventional and common anticorrosive agent is used, the processing oil on the surface of the terminal fitting 5 hinders the anticorrosive agent from coming into intimate contact with the surface of the terminal fitting 5 and may cause a gap between the surface of the terminal fitting 5 and the anticorrosive agent. As a result, moisture and the like may infiltrate the electrical connection portion 6 from the outside, and corrosion of metal parts is likely to progress. In order to prevent this, the anticorrosive agent 7 according to the present invention has a specific composition as described below.

The anticorrosive agent 7 contains an adhesive resin and an oil-adsorbing organic macromolecule. The oil-adsorbing organic macromolecule contained in the anticorrosive agent 7 adsorbs the processing oil adhering to the surface of the terminal fitting 5, and thus the adhesive resin contained in the anticorrosive agent 7 easily adheres to the metal on the surface of the terminal fitting 5. Therefore, the anticorrosive agent 7 favorably comes into intimate contact with the surface of the terminal fitting 5, and a high anticorrosive performance is obtained.

Any compound can be used as the oil-adsorbing organic macromolecule to be contained in the anticorrosive agent 7 as long as the compound is a macromolecular compound that can adsorb oil. Examples of the oil-adsorbing organic macromolecule include oil-adsorbing elastomer, oil-adsorbing rubber and oil-adsorbing gel. Among these, the oil-adsorbing elastomer or the oil-adsorbing rubber is preferable. This is because oil-adsorbing elastomers and oil-adsorbing rubbers have a high flexibility, and therefore, it is possible to improve the adhesiveness between the anticorrosive agent 7 and the terminal fitting 5 not only by the effect of adsorbing oil that is present on the surface of the terminal fitting 5 but also by the stress relaxation effect due to the impartment of flexibility when the oil-adsorbing elastomer or the oil-adsorbing rubber is mixed to the adhesive resin. Examples of the oil-adsorbing elastomer include styrene-based elastomer, urethane-based elastomer, and vinyl chloride-based elastomer. Specific examples of an oil-adsorbing macromolecule include a styrene ethylene butylene styrene block copolymer (SEBS), styrene butadiene rubber (SBR), nitrile rubber (NBR), chloroprene rubber (CR), carboxyl-terminated butadiene nitrile rubber (CTBN), natural rubber (NR), ethylene propylene diene rubber (EPDM), silicone rubber, and fluoro rubber. It is preferable that the oil-adsorbing organic macromolecule adsorbs oil in an amount of 0.05 ml/100 g or more.

It is preferable that the oil-adsorbing organic macromolecule is contained in the anticorrosive agent 7 in an amount of 1 mass % or more because sufficient oil-adsorbing properties are exhibited and the adhesiveness between the anticorrosive agent 7 and the terminal fitting 5 is improved. On the other hand, if the oil-adsorbing macromolecule such as oil-adsorbing elastomer or oil-adsorbing rubber is contained in an excessively large amount, the heat resistance of the anticorrosive agent 7 decreases. Therefore, it is preferable that the oil-adsorbing macromolecule is contained in an amount of 50 mass % or less because a sufficient heat resistance is ensured.

Any resin can be used as the adhesive resin to be contained in the anticorrosive agent 7 as long as the resin is a resin type that can adhere to the surface of metal, and examples thereof include an acrylic resin, an epoxy resin, a polyamide resin, a urethane resin, a silicone resin, and a polyolefin resin. These resins may be used alone or in combination of two or more. Curable resins of these resins are finally made into cured products. Additives such as a coloring pigment, a viscosity modifier, an antioxidant, an inorganic filler, a preservation stabilizer, and a dispersant may be added to the anticorrosive agent 7.

It is preferable that the adhesive resin to be contained in the anticorrosive agent 7 is selected from an ultraviolet curable resin, a heat curable resin, a moisture curable resin, and a two-part reaction curable resin. When such a curable resin is used in the anticorrosive agent 7, it is possible to apply the anticorrosive agent 7 onto the electrical connection portion 6 in a highly fluid state and to then cure the anticorrosive agent 7 in a state in which the anticorrosive agent 7 is in intimate contact with the outer peripheries of the terminal fitting 5 and the covered electric wire 2. Therefore, the electrical connection portion 6 can be covered with the anticorrosive agent 7 with high efficiency. If the ultraviolet curable resin is used, it is sufficient that curing operation is performed by irradiating the anticorrosive agent 7 with ultraviolet rays after the anticorrosive agent 7 is applied, and if the heat curable resin is used, it is sufficient that the curing operation is performed by heating the anticorrosive agent 7 after the anticorrosive agent 7 is applied. Moreover, the moisture curable resin is cured by being exposed to the moisture in the atmosphere for a predetermined period of time, and the two-part reaction curable resin is cured after a predetermined period of time passes after mixing two liquids. Therefore, it is sufficient that the anticorrosive agent containing such a resin is applied within a period of time from a time when the anticorrosive agent is prepared to a time when the anticorrosive agent starts to be cured, and is allowed to stand to be cured. It is sufficient to select which curable resin is used according to a portion to which the anticorrosive agent 7 is applied or the environment in which the anticorrosive agent 7 is used.

There are some ultraviolet curable resins to which a heat curing property, a moisture curing property, a two-part reaction curing property or an anaerobic curing property is imparted in addition to an ultraviolet curing property, and it is sufficient that these resins are further cured by a curing method corresponding to each property after being cured by ultraviolet rays. That is, if an ultraviolet curable resin also has a heat curing property, a moisture curing property, or a two-part reaction curing property, it is sufficient that the ultraviolet curable resin is further cured by the method described in the preceding paragraph after being irradiated with ultraviolet rays. If an ultraviolet curable resin also has an anaerobic curing property, it is sufficient that the ultraviolet curable resin is cured by being allowed to stand for a predetermined period of time in the environment in which the ultraviolet curable resin is in contact with metal and is not in contact with oxygen after being irradiated with ultraviolet rays. Moreover, there are some moisture curable resins to which an ultraviolet curing property or a two-part reaction curing property is imparted in addition to a moisture curing property. In this case, if a moisture curable resin also has an ultraviolet curing property, it is sufficient that the anticorrosive agent is cured by being exposed to the moisture in the atmosphere for a predetermined period of time after the anticorrosive agent is cured by ultraviolet rays, and if a moisture curable resin also has a two-part reaction curing property, it is sufficient that the anticorrosive agent is cured by being exposed to the moisture in the atmosphere for a predetermined period of time after mixing two liquids. Furthermore, there are some two-part reaction curable resins to which an ultraviolet curing property, a heat curing property or a moisture curing property is imparted in addition to a two-part reaction curing property. In this case, it is sufficient that the two-part reaction curable resin is cured by the same method corresponding to each property as described in the preceding paragraph after mixing two liquids.

If an ultraviolet curable resin is used as the adhesive resin contained in the anticorrosive agent 7, it is preferable to use an ultraviolet curable acrylic resin. Specific examples of the ultraviolet curable acrylic resin include an acrylate-based resin, a methacrylate-based resin, a urethane acrylate-based resin, a urethane methacrylate-based resin, an epoxy acrylate-based resin, an epoxy methacrylate-based resin, a polyester acrylate-based resin and a polyester methacrylate-based resin. If a heat curable resin is used as the adhesive resin contained in the anticorrosive agent 7, it is preferable to use a heat curable epoxy resin. Specific examples of the heat curable epoxy resin preferably include an epoxy-based resin, an epoxy acrylate-based resin and an epoxy methacrylate-based resin. If a moisture curable resin is used as the adhesive resin contained in the anticorrosive agent 7, it is preferable to use a moisture curable acrylic resin. Specific examples of the moisture curable acrylic resin preferably include an acrylate-based resin, a methacrylate-based resin, a urethane acrylate-based resin, a urethane methacrylate-based resin, an epoxy acrylate-based resin, an epoxy methacrylate-based resin, a polyester acrylate-based resin, a polyester methacrylate-based resin and cyano acrylate-based resin. If a two-part reaction curable resin is used as the adhesive resin contained in the anticorrosive agent 7, it is preferable to use a two-part reaction curable acrylic resin. Specific examples of the two-part reaction curable acrylic resin include an acrylate-based resin, a methacrylate-based resin, a urethane acrylate-based resin, a urethane methacrylate-based resin, an epoxy acrylate-based resin, an epoxy methacrylate-based resin, a polyester acrylate-based resin and a polyester methacrylate-based resin.

It should be noted that although the adhesive resins have various viscosities, it is sufficient to select viscosity as appropriate according to a position onto which the anticorrosive agent 7 is applied, an application use, or the like. If the anticorrosive agent 7 is applied to the electrical connection portion as described above, it is preferable that the adhesive resin has a viscosity in a range of 1000 to 20000 mPa·s.

The anticorrosive agent 7 can be prepared by mixing the adhesive resin, the oil-adsorbing organic macromolecule, and any other necessary additives. At this time, the temperature may be adjusted as appropriate in order to facilitate mixing, for example. When a rubber component serving as the oil-adsorbing macromolecule is mixed before the anticorrosive agent is applied, the rubber component may be mixed in a masterbatch form.

Here, some molecules of the oil-adsorbing organic macromolecule mixed to the adhesive resin are dispersed in the adhesive resin while the contours before mixing are maintained and other molecules thereof are compatible with the adhesive resin.

Any known method such as dripping, painting or extruding can be used to apply the anticorrosive agent 7. Moreover, the temperature of the anticorrosive agent 7 may be adjusted by heating, cooling, or the like during application. Furthermore, when being applied, the anticorrosive agent 7 may be diluted with a solvent into a liquid form in order to improve the permeability (application properties) of the anticorrosive agent 7. If the adhesive resin contained in the anticorrosive agent 7 is a curable resin, it is sufficient to perform processing for curing, such as ultraviolet irradiation or heating, as appropriate after the anticorrosive agent 7 is applied.

Hereinafter, components of the terminated covered electric wire 1 will be described.

The electric wire conductor 3 of the covered electric wire 2 is constituted by a stranded wire obtained by twisting a plurality of strands 3a. In this case, the stranded wire may be constituted by a single metal strand or two or more metal strands. Apart from the metal strand, the stranded wire may include a strand or strands made of organic fiber, or the like. It should be noted that "constituted by a single metal strand" means that all of the metal strands constituting the stranded wire are made of the same metal material, and "constituted by two or more metal strands" means that the stranded wire includes metal strands made of metal materials that are different from one another. The stranded wire may include a reinforcement wire (tension member) or the like for reinforcing the covered electric wire.

Examples of the material of the metal strand constituting the above electric wire conductor 3 include copper, a copper alloy, aluminum, and an aluminum alloy, or a material obtained by forming various types of plating on these materials. Moreover, examples of the material of the metal strand serving as the reinforcement wire include a copper alloy, titanium, tungsten, and stainless steel. Furthermore, one example of the organic fiber serving as the reinforcement wire is Kevlar.

Examples of the material of the insulator 4 include rubber, polyolefin, PVC, and a thermoplastic elastomer. These materials may be used alone or in combination of two or more. Various additives may be added to the material of the insulator 4 as appropriate. Examples of the additive include a flame retardant, a filler, and a coloring agent.

Examples of the material of the terminal fitting 5 (material of a base material) include various copper alloys and copper in addition to brass, which is commonly used. A portion (e.g., a contact point) of the surface of the terminal fitting 5 or the entire surface of the terminal fitting 5 may be plated with various types of metal, such as tin, nickel or gold.

The wire harness according to the present invention includes a plurality of covered electric wires including the above terminated covered electric wire 1 according to the present invention. All of the covered electric wires included in the wire harness may be the terminated electric wire 1 according to the present invention or only a portion thereof may be the terminated electric wire 1 according to the present invention.

Working Examples

Hereinafter, working examples and comparative examples of the present invention will be described. It should be noted that the present invention is not limited to these working examples.

Preparation of Anticorrosive Agent

Working Examples

The anticorrosive agents of Working Examples A1 to A40, B1 to B40, C1 to C40, and D1 to D40 were prepared by mixing an ultraviolet curable resin (UV curable resin), a heat curable resin, a moisture curable resin and a two-part reaction curable resin (two-part curable resin), and an oil-adsorbing macromolecule at a mixing ratio shown in Tables 1 to 5, 6 to 10, 11 to 15, and 16 to 20, respectively.

Comparative Examples

No oil-adsorbing macromolecule was mixed to each resin. A UV curable resin itself was used as Comparative Example A, a heat curable resin itself was used as Comparative Example B, a moisture curable resin itself was used as Comparative Example C, and a two-part curable resin itself was used as Comparative Example D.

The following resins and oil-adsorbing macromolecules were used.
  UV curable resin: "ARONIX BU810" available from Toagosei Co. Ltd.
  Heat curable resin: "GRS-817" available from Sanyu Rec Co. Ltd.

Moisture curable resin: "TB3056" available from Three-Bond Co. Ltd.
Two-part curable resin: "G55-033A/B" available from Denki Kagaku Kogyo
Oil-Adsorbing Macromolecule
  SEBS: "Tuftec H1041" available from Asahi Kasei Chemicals Corporation
  SBR: "Tufprene 125" available from Asahi Kasei Chemicals Corporation
  NBR: "Nipol 1042" available from Nippon Zeon Co., Ltd.
  CR: "Denka Chloroprene" available from Denki Kagaku Kogyo
  CTBN: "Hypro 1300×31" available from Emerald Performance Materials
Shear Adhesion Testing The anticorrosive agent of each of the working examples and comparative examples was applied with a thickness of 50 μm onto a tin-plated copper plate onto which terminal oil ("Unipress PA5" available from JX Nippon Oil & Energy Corporation) had been applied at a density of 1 mg/cm$^2$, the resulting plate and a glass plate were joined together, and then the resin was cured. The resulting plate was used as a test piece to perform tensile shear adhesion testing based on JIS K 6850. When the anticorrosive agent was cured, the anticorrosive agents of Working Examples A1 to A40 and Comparative Example A containing the UV curable resin were irradiated with ultraviolet rays, and the anticorrosive agents of Working Examples B1 to B40 containing the heat curable resin were heated. Moreover, in the anticorrosive agent of any of the working examples and comparative examples, the resin was cured such that the rate of reaction was 85% or more.

The fracture surface was observed by the naked eyes when shear fracture occurred, and whether the fracture form thereof was caused by cohesive fracture or interfacial fracture was evaluated. In Tables 1 to 20, the samples in which cohesive fracture occurred are referred to as "Cohesive", and the samples in which interfacial fracture occurred are referred to as "Interfacial".

Evaluation of Heat Resistance

The anticorrosive agent of each of the working examples and comparative examples was cured by ultraviolet irradiation or the like (rate of reaction of 85% or more), and a sheet made of the anticorrosive agent that had a size of 15 mm×15 mm×1 mm t was produced. Next, the produced sheet was sandwiched by a housing made of polybutylene terephthalate (PBT) from above and below, and a load of 50 g was applied to the entire sheet. The sheet was allowed to stand in this state at 120° C. for 3 hours, and the load was then removed.

Regarding the anticorrosive agents of Working Examples A1 to A40 and Comparative Example A containing the UV curable resin, whether or not the anticorrosive agent resin was in intimate contact with the surface of the housing was confirmed visually, and the heat resistance was evaluated. In Tables 1 to 5, the samples in which no intimate contact was observed were shown as "Good" because they were acceptable (heat resistance was sufficient), and the samples in which an intimate contact was observed were shown as "Poor" because they were not acceptable (heat resistance was insufficient).

Regarding the anticorrosive agents of Working Examples B1 to B40, C1 to C40, and D1 to D40, and Comparative Examples B, C, and D, which respectively contained the heat curable resin, the moisture curable resin, and the two-part curable resin, tensile testing was performed at room temperature, and the heat resistance was evaluated. In Tables 6 to 20, the samples in which tensile strength was 0.2 MPa or less when the fracture occurred and no cohesive fracture occurred were shown as "Good" because they were acceptable (heat resistance was sufficient), and the rest of the samples were shown as "Poor" because they were not acceptable (heat resistance was insufficient).

Results and Discussion

Tables 1 to 20 shows the mixing rate (unit: mass %) of the resin and the oil-adsorbing macromolecule in each anticorrosive agent of the working examples and comparative examples, and the results of the shear adhesion testing and the heat resistance evaluation.

TABLE 1

| | | Work. Ex. | | | | | | | | Comp. Ex. |
|---|---|---|---|---|---|---|---|---|---|---|
| | | A1 | A2 | A3 | A4 | A5 | A6 | A7 | A8 | A |
| Composition | UV curable resin (%) | 99.0 | 95.0 | 90.0 | 80.0 | 70.0 | 60.0 | 50.0 | 40.0 | 100.0 |
| | SEBS (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 2

| | | Work. Ex. | | | | | | | | Comp. Ex. |
|---|---|---|---|---|---|---|---|---|---|---|
| | | A9 | A10 | A11 | A12 | A13 | A14 | A15 | A16 | A |
| Composition | UV curable resin (%) | 99.0 | 95.0 | 90.0 | 80.0 | 70.0 | 60.0 | 50.0 | 40.0 | 100.0 |
| | SBR (%) | 1.0 | 5.0 | 10.0 | 20.0 | 30.0 | 40.0 | 50.0 | 60.0 | 0.0 |

TABLE 2-continued

|  |  | Work. Ex. | | | | | | | | Comp. Ex. |
|---|---|---|---|---|---|---|---|---|---|---|
|  |  | A9 | A10 | A11 | A12 | A13 | A14 | A15 | A16 | A |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 3

|  |  | Work. Ex. | | | | | | | | Comp. Ex. |
|---|---|---|---|---|---|---|---|---|---|---|
|  |  | A17 | A18 | A19 | A20 | A21 | A22 | A23 | A24 | A |
| Composition | UV curable resin (%) | 99.0 | 95.0 | 90.0 | 80.0 | 70.0 | 60.0 | 50.0 | 40.0 | 100.0 |
|  | NBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 4

|  |  | Work. Ex. | | | | | | | | Comp. Ex. |
|---|---|---|---|---|---|---|---|---|---|---|
|  |  | A25 | A26 | A27 | A28 | A29 | A30 | A31 | A32 | A |
| Composition | UV curable resin (%) | 99.0 | 95.0 | 90.0 | 80.0 | 70.0 | 60.0 | 50.0 | 40.0 | 100.0 |
|  | CR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 5

|  |  | Work. Ex. | | | | | | | | Comp. Ex. |
|---|---|---|---|---|---|---|---|---|---|---|
|  |  | A33 | A34 | A35 | A36 | A37 | A38 | A39 | A40 | A |
| Composition | UV curable resin (%) | 99.0 | 95.0 | 90.0 | 80.0 | 70.0 | 60.0 | 50.0 | 40.0 | 100.0 |
|  | CTBN (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 6

| | | Work. Ex. | | | | | | | | Comp. Ex. |
|---|---|---|---|---|---|---|---|---|---|---|
| | | B1 | B2 | B3 | B4 | B5 | B6 | B7 | B8 | B |
| Composition | Heat curable resin (%) | 99.0 | 95.0 | 90.0 | 80.0 | 70.0 | 60.0 | 50.0 | 40.0 | 100.0 |
| | SEBS (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 7

| | | Work. Ex. | | | | | | | | Comp. Ex. |
|---|---|---|---|---|---|---|---|---|---|---|
| | | B9 | B10 | B11 | B12 | B13 | B14 | B15 | B16 | B |
| Composition | Heat curable resin (%) | 99.0 | 95.0 | 90.0 | 80.0 | 70.0 | 60.0 | 50.0 | 40.0 | 100.0 |
| | SBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 8

| | | Work. Ex. | | | | | | | | Comp. Ex. |
|---|---|---|---|---|---|---|---|---|---|---|
| | | B17 | B18 | B19 | B20 | B21 | B22 | B23 | B24 | B |
| Composition | Heat curable resin (%) | 99.0 | 95.0 | 90.0 | 80.0 | 70.0 | 60.0 | 50.0 | 40.0 | 100.0 |
| | NBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 9

| | | Work. Ex. | | | | | | | | Comp. Ex. |
|---|---|---|---|---|---|---|---|---|---|---|
| | | B25 | B26 | B27 | B28 | B29 | B30 | B31 | B32 | B |
| Composition | Heat curable resin (%) | 99.0 | 95.0 | 90.0 | 80.0 | 70.0 | 60.0 | 50.0 | 40.0 | 100.0 |
| | CR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 10

| | | Work. Ex. | | | | | | | | Comp. Ex. |
|---|---|---|---|---|---|---|---|---|---|---|
| | | B33 | B34 | B35 | B36 | B37 | B38 | B39 | B40 | B |
| Composition | Heat curable resin (%) | 99.0 | 95.0 | 90.0 | 80.0 | 70.0 | 60.0 | 50.0 | 40.0 | 100.0 |
| | CTBN (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 11

| | | Work. Ex. | | | | | | | | Comp. Ex. |
|---|---|---|---|---|---|---|---|---|---|---|
| | | C1 | C2 | C3 | C4 | C5 | C6 | C7 | C8 | C |
| Composition | Moisture curable resin (%) | 99.0 | 95.0 | 90.0 | 80.0 | 70.0 | 60.0 | 50.0 | 40.0 | 100.0 |
| | SEBS (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 12

| | | Work. Ex. | | | | | | | | Comp. Ex. |
|---|---|---|---|---|---|---|---|---|---|---|
| | | C9 | C10 | C11 | C12 | C13 | C14 | C15 | C16 | C |
| Composition | Moisture curable resin (%) | 99.0 | 95.0 | 90.0 | 80.0 | 70.0 | 60.0 | 50.0 | 40.0 | 100.0 |
| | SBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 13

| | | Work. Ex. | | | | | | | | Comp. Ex. |
|---|---|---|---|---|---|---|---|---|---|---|
| | | C17 | C18 | C19 | C20 | C21 | C22 | C23 | C24 | C |
| Composition | Moisture curable resin (%) | 99.0 | 95.0 | 90.0 | 80.0 | 70.0 | 60.0 | 50.0 | 40.0 | 100.0 |
| | NBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 14

| | | Work. Ex. | | | | | | | | Comp. Ex. |
|---|---|---|---|---|---|---|---|---|---|---|
| | | C25 | C26 | C27 | C28 | C29 | C30 | C31 | C32 | C |
| Composition | Moisture curable resin (%) | 99.0 | 95.0 | 90.0 | 80.0 | 70.0 | 60.0 | 50.0 | 40.0 | 100.0 |
| | CR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 15

| | | Work. Ex. | | | | | | | | Comp. Ex. |
|---|---|---|---|---|---|---|---|---|---|---|
| | | C33 | C34 | C35 | C36 | C37 | C38 | C39 | C40 | C |
| Composition | Moisture curable resin (%) | 99.0 | 95.0 | 90.0 | 80.0 | 70.0 | 60.0 | 50.0 | 40.0 | 100.0 |
| | CTBN (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 16

| | | Work. Ex. | | | | | | | | Comp. Ex. |
|---|---|---|---|---|---|---|---|---|---|---|
| | | D1 | D2 | D3 | D4 | D5 | D6 | D7 | D8 | D |
| Composition | Two-part curable resin (%) | 99.0 | 95.0 | 90.0 | 80.0 | 70.0 | 60.0 | 50.0 | 40.0 | 100.0 |
| | SEBS (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 17

| | | Work. Ex. | | | | | | | | Comp. Ex. |
|---|---|---|---|---|---|---|---|---|---|---|
| | | D9 | D10 | D11 | D12 | D13 | D14 | D15 | D16 | D |
| Composition | Two-part curable resin (%) | 99.0 | 95.0 | 90.0 | 80.0 | 70.0 | 60.0 | 50.0 | 40.0 | 100.0 |
| | SBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
| | Heat resistance | Good | Good | Good | Good | Good | Good | Good | Poor | Good |

TABLE 18

|  |  | Work. Ex. | | | | | | | | Comp. Ex. |
|---|---|---|---|---|---|---|---|---|---|---|
|  |  | D17 | D18 | D19 | D20 | D21 | D22 | D23 | D24 | D |
| Composition | Two-part curable resin (%) | 99.0 | 95.0 | 90.0 | 80.0 | 70.0 | 60.0 | 50.0 | 40.0 | 100.0 |
|  | NBR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 19

|  |  | Work. Ex. | | | | | | | | Comp. Ex. |
|---|---|---|---|---|---|---|---|---|---|---|
|  |  | D25 | D26 | D27 | D28 | D29 | D30 | D31 | D32 | D |
| Composition | Two-part curable resin (%) | 99.0 | 95.0 | 90.0 | 80.0 | 70.0 | 60.0 | 50.0 | 40.0 | 100.0 |
|  | CR (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

TABLE 20

|  |  | Work. Ex. | | | | | | | | Comp. Ex. |
|---|---|---|---|---|---|---|---|---|---|---|
|  |  | D33 | D34 | D35 | D36 | D37 | D38 | D39 | D40 | D |
| Composition | Two-part curable resin (%) | 99.0 | 95.0 | 90.0 | 80.0 | 70.0 | 60.0 | 50.0 | 40.0 | 100.0 |
|  | CTBN (%) | 1.0 | 5.0 | 10.0 | 20.0 | 30.0 | 40.0 | 50.0 | 60.0 | 0.0 |
| Testing result | Shear adhesion testing | Cohesive | Cohesive | Cohesive | Cohesive | Cohesive | Cohesive | Cohesive | Cohesive | Interfacial |
|  | Heat resistance | Good | Good | Good | Good | Good | Good | Good | Poor | Good |

If the sufficient adhesive strength was achieved between the anticorrosive agent and the tin-plated copper plate, cohesive fracture was observed in the shear adhesion testing, whereas if the adhesive strength therebetween was insufficient, interfacial fracture was observed. From the results shown in Tables 1 to 20, it was found that interfacial fracture was observed in the comparative examples, while cohesive fracture was observed in the working examples.

Although the oil-adsorbing macromolecule and the resin used were different in each table, cohesive fracture was observed and a high adhesive strength was obtained in each working example regardless of the types of the oil-adsorbing macromolecule and the resin.

Since the anticorrosive agent of each comparative example was constituted by only a resin, the anticorrosive agent could not come into intimate contact with the tin-plated copper plate to which terminal oil had been applied. It was thought that only a low adhesive strength with respect to the tin-plated copper plate was thus obtained, and interfacial fracture was observed in the shear adhesion testing.

On the other hand, the anticorrosive agent of each working example contained the oil-adsorbing macromolecule, and the oil-adsorbing macromolecule adsorbed the terminal oil that had been applied onto the tin-plated copper plate. It was thought that the resin contained in the anticorrosive agent could thus come into intimate contact with the tin-plated copper plate, and a high adhesive strength was obtained between the anticorrosive agent and the tin-plated copper plate, as a result of which cohesive fracture was observed in the shear adhesion testing.

In this manner, when the anticorrosive agent contains the oil-adsorbing macromolecule, the anticorrosive agent can exhibit a high adhesive force with respect to a surface on which oil is present, but when the anticorrosive agent contains the oil-adsorbing macromolecule in a large amount, there is a risk that the heat resistance of the anticorrosive agent decreases. In the working examples in which the oil-adsorbing macromolecule was contained in an amount of 60 mass %, which is more than 50 mass %, a high heat resistance was not observed in the heat resistance evaluation due to the oil-adsorbing macromolecule being contained in a large amount. On the other hand, in the rest of the working examples, since the oil-adsorbing macromolecule was contained in an amount of 50 mass % or less, a high heat resistance was obtained while the sufficient adhesive strength was achieved.

While the embodiment of the present invention has been described in detail, the present invention is not limited to the above-described embodiment, and various modifications can be made without departing from the gist of the present invention.

The invention claimed is:

1. A terminated covered electric wire comprising:
a terminal fitting having a surface to which oil adheres;
an electric wire conductor of a covered electric wire; and
an electrical connection portion in which the terminal fitting and the electric wire conductor are electrically connected to each other, wherein
the electrical connection portion is covered with an anticorrosive agent comprising an adhesive resin and an oil-adsorbing organic macromolecule mixed together with the adhesive resin, and
the oil-adsorbing organic macromolecule adsorbs the oil adhered to the terminal fitting.

2. The terminated covered electric wire according to claim 1,
wherein the oil-adsorbing organic macromolecule is contained in the anticorrosive agent in an amount in a range of 1 to 50 mass %.

3. The terminated covered electric wire according to claim 1,
wherein the oil-adsorbing organic macromolecule is oil-adsorbing elastomer or oil-adsorbing rubber.

4. The terminated covered electric wire according to claim 1,
wherein the adhesive resin is at least one selected from an acrylic resin, an epoxy resin, a polyamide resin, a urethane resin, a silicone resin, and a polyolefin resin.

5. The terminated electric wire according to claim 1,
wherein the adhesive resin is selected from an ultraviolet curable resin, a heat curable resin, a moisture curable resin, and a two-part reaction curable resin.

6. A wire harness having the terminated electric wire according to claim 1.

7. The terminated covered electric wire according to claim 1, wherein the oil-adsorbing organic macromolecule adsorbs oil in an amount of 0.05 ml/100 g.

8. The terminated covered electric wire according to claim 1,
wherein the oil-adsorbing organic macromolecule is an oil-adsorbing elastomer selected from the group consisting of a styrene-based elastomer, a urethane-based elastomer, and a vinyl chloride-based elastomer.

9. The terminated covered electric wire according to claim 1,
wherein the oil-adsorbing organic macromolecule is selected from the group consisting of a styrene ethylene butylene styrene block copolymer, a styrene butadiene rubber, a nitrile rubber, a chloroprene rubber, a carboxyl-terminated butadiene nitrile rubber, a natural rubber, an ethylene propylene diene rubber, a silicone rubber, and a fluoro rubber.

10. An anticorrosive agent comprising:
an adhesive resin; and
an oil-adsorbing organic macromolecule mixed together with the adhesive resin, wherein
the anticorrosive agent covers an electrical connection portion in which a terminal fitting and an electric wire conductor are electrically connected to each other;
the terminal fitting has a surface to which oil adheres, and
the oil-adsorbing organic macromolecule adsorbs the oil adhered to the terminal fitting.

11. The anticorrosive agent according to claim 10,
wherein the oil-adsorbing organic macromolecule is contained in the anticorrosive agent in an amount in a range of 1 to 50 mass %.

12. The anticorrosive agent according to claim 10,
wherein the oil-adsorbing organic macromolecule is oil-adsorbing elastomer or oil-adsorbing rubber.

13. The anticorrosive agent according to claim 10,
wherein the adhesive resin is at least one selected from an acrylic resin, an epoxy resin, a polyamide resin, a urethane resin, a silicone resin, and a polyolefin resin.

14. The anticorrosive agent according to claim 10,
wherein the adhesive resin is selected from an ultraviolet curable resin, a heat curable resin, a moisture curable resin, and a two-part reaction curable resin.

15. The anticorrosive agent according to claim 10,
wherein the oil-adsorbing organic macromolecule adsorbs oil in an amount of 0.05 ml/100 g.

16. The anticorrosive agent according to claim 10,
wherein the oil-adsorbing organic macromolecule is an oil-adsorbing elastomer selected from the group consisting of a styrene-based elastomer, a urethane-based elastomer, and a vinyl chloride-based elastomer.

17. The anticorrosive agent according to claim 10,
wherein the oil-adsorbing organic macromolecule is selected from the group consisting of a styrene ethylene butylene styrene block copolymer, a styrene butadiene rubber, a nitrile rubber, a chloroprene rubber, a carboxyl-terminated butadiene nitrile rubber, a natural rubber, an ethylene propylene diene rubber, a silicone rubber, and a fluoro rubber.

* * * * *